(12) United States Patent
Akanuma et al.

(10) Patent No.: US 7,701,584 B2
(45) Date of Patent: Apr. 20, 2010

(54) LIGHT PATH CIRCUIT APPARATUS AND RING LASER GYRO

(75) Inventors: Goichi Akanuma, Yokohama (JP); Kazusuke Maenaka, Himeji (JP); Takayuki Fujita, Himeji (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/170,490

(22) Filed: Jul. 10, 2008

(65) Prior Publication Data

US 2009/0021744 A1 Jan. 22, 2009

(30) Foreign Application Priority Data

Jul. 11, 2007 (JP) .............................. 2007-182578

(51) Int. Cl.
*G01C 19/64* (2006.01)
(52) U.S. Cl. ...................... 356/459; 356/462; 356/471
(58) Field of Classification Search ......... 356/459–462, 356/471
See application file for complete search history.

(56) References Cited

U.S. PATENT DOCUMENTS 4,431,308 A * 2/1984 Mitsuhashi et al. ......... 356/459
7,145,165 B2 * 12/2006 Cox et al. .................. 250/573
2008/0285046 A1 * 11/2008 Fullerton ..................... 356/459
2009/0014670 A1 * 1/2009 Cole et al. .................. 250/573
2009/0116031 A1 * 5/2009 Schwartz et al. ............ 356/459

FOREIGN PATENT DOCUMENTS

| JP | 62-39836 | 8/1987 |
| JP | 02-60127 | 12/1990 |
| JP | 2835874 | 10/1998 |
| JP | 2002-318117 | 10/2002 |
| JP | 3751553 | 12/2005 |
| JP | 2007-71577 | 3/2007 |
| JP | 2008-131109 | 6/2008 |
| JP | 2008-268645 | 11/2008 |

* cited by examiner

*Primary Examiner*—Tarifur Chowdhury
*Assistant Examiner*—Jonathan M Hansen
(74) *Attorney, Agent, or Firm*—Dickstein Shapiro LLP

(57) ABSTRACT

A light path circuit apparatus suited for a small sized ring laser gyro, includes a base having a standard plane, one or more substrates laminated parallel against the standard plane in a direction orthogonal to the standard plane, a light source, wherein on the base and/or the one or more substrates, 3 or more reflective surfaces, having normal lines within a prescribed one plane orthogonal to the standard plane, are constituted parallel or with tilt by a prescribed angle to the standard plane, the light source is disposed to emit light within the prescribed one plane, and the light emitted from the light source circulates within the one plane in a forward and backward direction by three or more reflective surfaces and constitutes a light path circuit that laser oscillates.

13 Claims, 13 Drawing Sheets

LIGHT PATH CIRCUIT APPARATUS AND RING LASER GYRO

PRIORITY CLAIM

This application is based on and claims priority from Japanese Patent Application No. 2007-182578, filed on Jul. 11, 2007, the disclosure of which is incorporated herein by reference in its entirety.

BACKGROUND OF THE INVENTION

1. Field of the invention

The present invention relates to a light path circuit apparatus and a ring laser gyro.

2. Description of the Related Art

An angular velocity sensor has applications in many fields such as car navigation, vibration correction of cameras, video games, air planes, rockets and robots and so on. As an angular velocity sensor, a vibration type is conventionally known that lets an object vibrate by piezoelectricity or electrostatic force and calculates the angular velocity by detecting the Coriolis force generated, or an optical fiber gyro or a ring laser gyro that utilizes Sagnac effects.

A vibration type gyro is not suited for detection of absolute angles because the zero point offset is large. Although optical fiber gyros or a ring lasers gyro have high performance, they are not suited to consumer use because of their comparatively large size and high price.

By MEMS technologies, a technology to constitute a light path circuit part of a ring laser gyro using anisotropic etching of a silicon is disclosed in JP3751553B. This technology can easily constitute a light path circuit part with high precision by batch processing so that a smaller sized and lower cost ring laser gyro can be realized.

However, because the technology described in JP3751553B forms a light path circuit on a surface parallel to the substrate, the angular velocity in only one axial direction is detected. When performing angular velocity detection in more than two axial directions, if a light path circuit part described in JP3751553B is used, it is necessary to combine two or more light path circuit parts used for the detection of each of the axial directions and the device thus becomes too large in size. In addition, when combining two light path circuit parts used for angular velocity detection in one axial direction, it is difficult to ensure that the two parts are mutually orthogonal at the time of assembly.

SUMMARY OF THE INVENTION

An object of the present invention is to provide a new light path circuit apparatus that can be produced at low cost and is suited to a small sized ring laser gyro. In addition, a further object of the present invention is to provide a new light path circuit apparatus that is able to easily perform angular velocity detection in more than two axial directions and furthermore, a ring laser gyro using these light path circuit apparatuses.

A light path circuit apparatus according to one embodiment of the present invention includes a base having a standard plane; a plurality of substrates laminated parallel to the standard plane in a direction orthogonal to the standard plane; and a light source, wherein on the base and/or the one or more substrates, 3 or more reflective surfaces, having normal lines within a predetermined one plane orthogonal to the standard plane, are constituted parallel or with a tilt by a predetermined angle to the standard plane, the light source is disposed to emit light within the predetermined one plane, and the light emitted from the light source circulates within the one plane in forward and backward directions by means of three or more reflective surfaces and constitutes a circling light path that oscillates a laser.

Three or more reflective surfaces are constituted on a base and/or one or more substrates.

These three or more reflective surfaces include normal lines within a prescribed one plane orthogonal to the standard plane and are constituted parallel or with a tilt by a prescribed angle to the standard plane.

A light source is disposed to emit light within the prescribed one plane, light emitted from the light source circulates in forward and backward directions within the one plane by the three or more reflective surfaces, thereby constituting a light path circuit that oscillates a laser. That is, the light source and the three or more reflective surfaces are set in a positional relationship so that the light path circuit is constituted.

DETAILED DESCRIPTION OF THE PREFERRED EMBODIMENTS

Preferred embodiments of the present invention will be explained in detail hereinafter with reference to the accompanying drawings.

FIG. 1 illustrates an embodiment of the light path circuit apparatus.

Figure 1A:
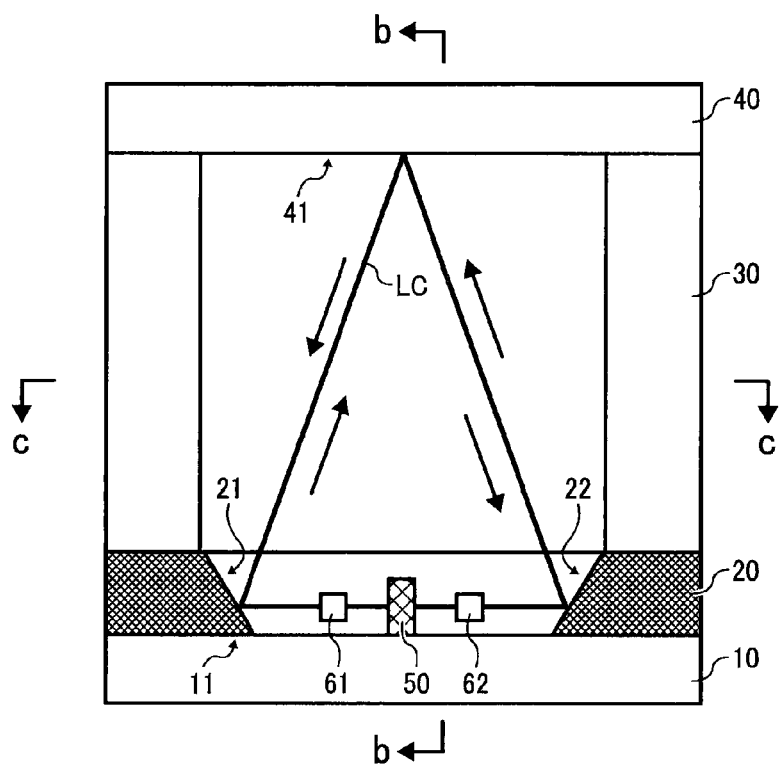
FIG. 1A is a cross-sectional diagram of the light path circuit apparatus.
Figure 1B:
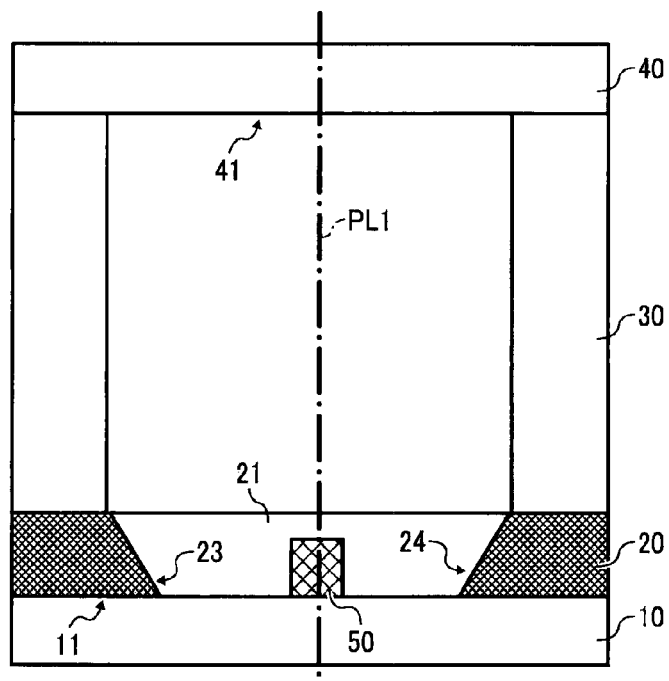
FIG. 1B is a cross-sectional diagram along the b-b line of FIG. 1A.
Figure 1C:
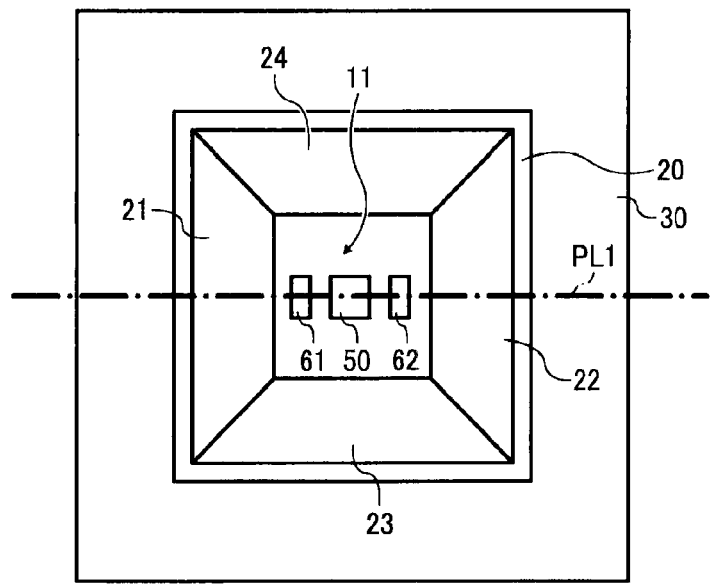
FIG. 1C is a cross-sectional diagram along the c-c line of FIG. 1A.

FIG. 1A is a cross-sectional diagram of the light path circuit apparatus. FIG. 1B is a cross-sectional diagram along the b-b line of FIG. 1A. FIG. 1C is a cross-sectional diagram along the c-c line of FIG. 1A. FIG. 1A, FIG. 1B and FIG. 1C are all schematic diagrams. A hatch or the like that illustrates the cross-section is suitably abbreviated. In addition, because FIG. 1A, FIG. 1B and FIG. 1C are all schematic diagrams, it should be noted that the ratio of the size of each part or the like is not precise. This is also true for the following figures. To exemplify the size of the light path circuit apparatus illustrated in FIG. 1, the size in the up and down, left and right direction of FIG. 1A~1C is about a couple of millimeters.

In FIG. 1A, reference numeral 10 illustrates a bottom surface substrate, reference numeral 20 illustrates a first reflective surface substrate, reference numeral 30 illustrates a spacer substrate, reference numeral 40 illustrates a second reflective surface substrate. In addition, reference numeral 50 illustrates a light source, reference numerals 61, 62 respectively illustrates a micro lens.

In this embodiment, the bottom surface substrate 10 is a base. The plane illustrated by the reference numeral 11 constitutes the standard plane. The first reflective surface substrate 20 is in the shape of a thin parallel flat plate, a hole of a shape of a regular quadrangular pyramid is drilled through the center part thereof with the thickness direction as the depth direction. In FIG. 1A through FIG. 1C, reference numerals 21, 22, 23, 24 indicate the wall surface of the hole of a shape of a regular quadrangular pyramid.

The spacer substrate 30 is a substrate used to set the space between the first reflective surface substrate 20 and the second reflective surface substrate 40 to a prescribed interval. As shown in FIG. 1C, a hole in the shape of a square is drilled through in the thickness direction. The size of the hole in the shape of a square is slightly larger than the size of the bottom surface of a hole on a regular quadrangular pyramid drilled through the first reflective surface substrate 20.

The second reflective surface substrate 40 disposed on the spacer substrate 30 has a shape of a thin parallel flat plate. A flat surface part on the lower side of the figure is a reflective surface 41.

The light source 50 is a semiconductor laser element in the present embodiment. In FIG. 1A, the light source 50 emits laser beams parallel to the standard reflective surface 11 in left and right directions within a surface of the figure. A semiconductor laser element of the present embodiment emits light from both end surfaces of a tip, and an antireflective coating is formed on the both end surfaces so that there is no reflection on end surfaces. The light source 50 is sometimes referred to as a semiconductor laser element 50 hereinbelow.

Micro lenses 61, 62 are mounted near edge surfaces on both sides of the semiconductor laser element 50 to adjust divergence angles of laser beams emitted from the semiconductor laser element. That is, the micro lenses 61, 62 are divergence angle adjustment devices that adjust the divergence angles of light emitted from the light source 50. The light source 50 and the micro lenses 61, 62 are mounted by an appropriate method on an upper surface of the bottom surface-substrate 10 which forms a standard plane.

In addition, the light beams emitted from the light source 50 have diffusion properties. The light beam diameter of laser beams passing through the light path circuit changes according to positions, but such changes in light beam shape are not illustrated in FIG. 1 because the figures become more complex. The following figures are treated the same.

In FIGS. 1B, 1C, sign PL1 is one plane in which the light path circuit is constituted. As shown in FIGS. 1B, 1C, PL1 is orthogonal to the standard plane 11. One plane PL1 is parallel to the figure in FIG. 1A, reflective surfaces 21, 22, 41 all have normal lines parallel to the one plane PL1. Thereby, one plane PL1 is included within the plane normal lines of these reflective surfaces 21, 22, 41.

One plane PL1 including laser beams emitted from the semiconductor laser element 50 and light axes of the micro lenses 61, 62 as divergence angle adjustment devices that adjust the divergence angles of these laser beams, is a plane orthogonal to the standard plane 11.

Therefore, when laser beams from the light source 50 are emitted to the left and right directions of FIG. 1A, the emitted laser beams have the divergence angles adjusted by the micro lenses 61, 62 and are reflected by the reflective surfaces 21, 22, 41. The laser beams emitted towards the side of the reflective surface 21 from the light source 50, have the divergence angle adjusted by the micro lens 61, are reflected in sequence by the reflective surfaces 21, 41, 22 and return to the light source 50 via the micro lens 62. The laser beams emitted towards the side of the reflective surface 22 from the light source 50, have the divergence angle adjusted by the micro lens 62, are reflected in sequence by the reflective surfaces 22, 41, 21 and return to the light source 50 via the micro lens 61.

In such a way, the laser beams emitted in two directions from the light source 50, are constituted within one plane PL1 of a light path circuit LC that laser oscillates and circulates in forward and backward directions. This light path circuit, as shown in FIG. 1A, is of a triangular shape. The light path in a forward direction and the light path in a backward direction are the same. The adjustment of divergence angles by the micro lenses 61, 62 is performed so that wavefront shape of laser beams circulating the light path circuit in forward and backward directions and returning to the light source becomes a surface shape which helps improve the efficiency of laser oscillation.

That is, a light path circuit apparatus with an embodiment illustrated in FIG. 1, includes a base 10 having a standard plane 11, one or more substrates 20, 30, 40 laminated parallel against the standard plane 11 in a direction orthogonal to the standard plane and a light source 50 whereby three or more reflective surfaces 21, 22, 41 on one or more substrates 20, 40 have normal lines within a prescribed one plane PL1 orthogonal to the standard plane 11 and are constituted parallel or with a prescribed angle tilt to the standard plane 11, the light source 50 is disposed to emit light within a prescribed one plane PL1, the light emitted from the light source 50 constitutes a light path circuit LC that laser oscillates and circulates in forward and backward directions within one plane PL1 reflected by the three or more reflective surfaces 21, 22, 41 (claim 1). The light path circuit of claim 1 constituted within one plane orthogonal to the standard plane is hereinbelow termed as the first light path circuit.

In addition, the micro lenses 61, 62, as divergence angle adjustment devices, perform adjustment of divergence angles so that as noted above, the wavefront shape of laser beams circulating the light path circuit in forward and backward directions and returning to the light source help improve the efficiency of laser oscillation. By using the micro lenses 61, 62, the efficiency of laser oscillation of the light source 50 can be heightened but it is known that laser oscillation is also possible without the divergence angle adjustment devices and a light path circuit can be formed. Therefore, the divergence angle adjustment devices are not required for a light path circuit apparatus according to the present invention.

In addition, the bottom surface substrate 10 and the first reflective surface substrate 20 can be set as a singular substrate, a surface on one side of which is set as a base with a hole of a shape of a regular quadrangular pyramid with the head portion cut off formed thereon. The spacer substrate 30 and the second reflective surface substrate 40 can be set as a singular substrate, a hole with a depth equal to the height of the spacer can be formed on a surface on one side of the singular substrate. By setting to a constitution as such, a light path circuit apparatus is realized with a constitution of laminating a singular substrate parallel to the standard surface on the standard surface of the base, the singular substrate has a hole of a depth equal to the height of the spacer.

In addition, because the spacer substrate 30 is used to form a space for the light path circuit, by letting the depth of a hole of a shape of a regular quadrangular pyramid formed on the first reflective surface substrate 20 be sufficiently deep, the second reflective surface substrate 40 is agglutinated directly onto the first reflective surface substrate 20 and not via the spacer substrate.

In the embodiment of FIG. 1, of the bottom surface substrate 10 that constitutes a base, because the shape of a surface on the opposite side to the standard plane does not have any influence on the formation of the light path circuit. The part on the opposite side to the standard plane is not required to be a plane but can be any appropriate shape. When "substrate" is used in this specification, the shape of the substrate is not necessarily a parallel flat plate.

In the same way, the shape of a side of the second reflective surface substrate 40 in which reflective surface 41 is not constituted, does not have any influence on the formation of the light path circuit. The part is not required to be a plane but can be any appropriate shape.

In addition, the surface of the bottom surface substrate 10 on the opposite side to the standard plane and the surface of the second reflective surface substrate 40 on the opposite side to reflective surface 41 can be set to planes so that three or more reflective surfaces and a light source for forming another light path circuit in which light circulates within a plane parallel to the standard plane are constituted.

In addition, in a light path circuit apparatus of an embodiment of FIG. 1, as described later, the process of taking out a portion of the laser beams circulating the light path circuit in forward and backward directions in order to generate interference fringe, can be performed on the side of the second reflective surface substrate 40. In this case, reflective surfaces 21, 22 can be applied with gold coating or the like so that laser beams can be easily reflected.

In the light path circuit apparatus described referring to FIG. 1, in order to constitute a hole having a tilted surface of a shape of a regular quadrangular pyramid as described above on the first reflective surface substrate 20, the following procedure can be applied.

That is, a silicon substrate is used as the first reflective surface substrate 20, the surface thereof (in FIG. 1A, the surface of the side in which the spacer substrate 30 is disposed) is defined as the 100 surface of silicon crystal. When anisotropic wet etching is performed against the 100 surface, the 111 surface is exposed and a hole of a shape of a regular quadrangular pyramid can be constituted easily and with certainty. The 111 surface constituted herewith is used as a reflective surface, and a tilted angle formed by the reflective surface against the standard plane becomes precisely ±54.7 degree.

In the embodiment of FIG. 1, the first reflective surface substrate 20 is obtained by applying etching to the silicon substrate as described above, whereby a spacer substrate 30 with a hole for constituting a space of the light path circuit drilled through is laminated and agglutinated to a surface of the first reflective surface substrate 20 of the side where a large opening is formed. Further on top of that, the second reflective surface substrate 40 is laminated and agglutinated with a reflective surface 41 constituted in the under surface.

In addition, as described above, the bottom surface substrate 10 and the first reflective surface substrate 20 can be set as a singular substrate, a surface on one side of which can be set as a base with a hole of a shape of a regular quadrangular pyramid with the head portion cut off formed thereon. In this case, when constituting by anisotropic wet etching a tilted surface that should become a reflective surface with the base as a silicon substrate, in order to mount the light source 50 and the micro lenses 61, 62, it is necessary for a bottom surface part of the hole to be a flat and smooth surface parallel to the standard plane but the constitution of such a bottom surface part is not necessarily easy.

Therefore, as shown in FIG. 1, on the first reflective surface member, a hole of a shape of a regular quadrangular pyramid with the head portion cut off is drilled through the first reflective surface member 20. This part is covered by a bottom surface substrate 10 having an even plane as the standard plane 11. With the standard plane 11 as the bottom surface of the hole, the semiconductor laser element 50 and micro lenses 61, 62 can be mounted to the bottom surface.

The semiconductor laser element 50 as a light source can be mounted onto a prepared fixed base.

A precise light path circuit cannot be constituted if the position of the reflective surface 41 of the second reflective surface substrate 40 is out of alignment. The reflective surface 41 can be adjusted in micromotion to up and down directions of FIG. 1A by setting a static actuator or the like.

Figure 2:
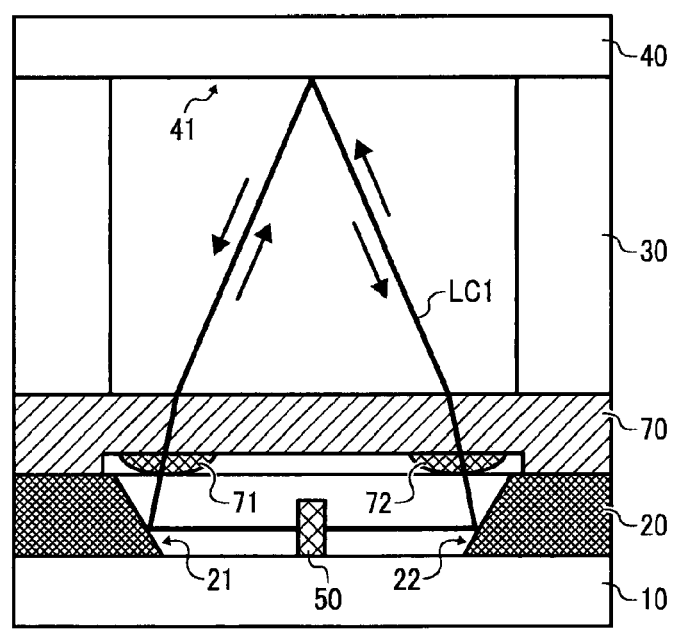
FIG. 2 is a diagram that illustrates a modified example of the light path circuit apparatus of FIG. 1.

FIG. 2 illustrates descriptively a modified example to the embodiment of FIG. 1. In order to avoid complexity, the same signs as FIG. 1 are used for like items and the same descriptions as FIG. 1 are used for the descriptions of these items.

In the embodiment of FIG. 2, a glass substrate 70 is laminated between the spacer substrate 30 and the first reflective surface substrate 20 (specifically, the above-described silicon substrate). Micro lenses 71, 72 as the divergence angle adjustment device are constituted on one surface of the glass substrate 70 parallel to the standard plane.

Laser beams emitted to the left and right directions of the figure from the semiconductor laser element 50, are respectively reflected by the reflective surfaces 21, 22, then have the divergence angles adjusted by the micro lenses 71, 72, thereafter transmit through the glass substrate 70, then reflected by a reflective surface 41 of the second reflective surface substrate 40, then reflected by the reflective surfaces 21, 22 via the micro lenses 71, 72, then return to the light source 50, thereby constituting a light path circuit LC1 that laser oscillates. The thickness or the like of the spacer substrate 30, in consideration of the thickness or the like of the glass substrate 70, is adjusted so that the above-described light path circuit LC1 is constituted.

In the embodiment of FIG. 1, light axes of the micro lenses 61, 62 are parallel to the standard plane, in general, it is difficult to have these built into the surface of the bottom surface substrate 10. The micro lenses 61, 62 formed as separate bodies are disposed on the standard plane of the bottom surface substrate subsequently and a precise installation process becomes necessary. In the embodiment of FIG. 2, light axes of the micro lenses 71, 72 are orthogonal to the surface of the glass substrate, the objective of the constituting micro lenses 71, 72 to the surface of the glass substrate 70 can be easily realized by combining photolithography technologies with etching or the like and the manufacturing of the light path circuit apparatus becomes easy.

Light path circuit LC1 is constituted within a plane orthogonal to the standard plane (a plane parallel to the figure of FIG. 2).

Herewith, using a light path circuit apparatus the same as the one illustrated in FIG. 1, an embodiment of a ring laser gyro that performs angular velocity detection is described. Referring to FIG. 3, in order to avoid complexity, the same signs as FIG. 1 are used for like items and the same descriptions as FIG. 1 are used for the descriptions of these items.

Figure 3A:
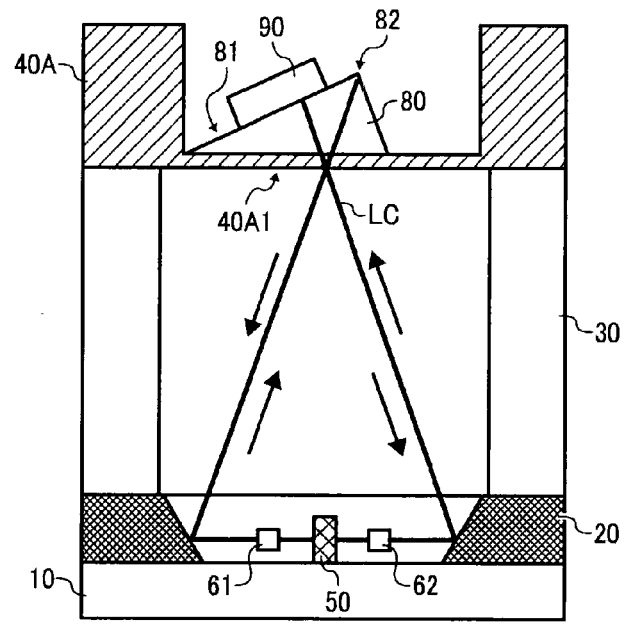
FIG. 3A is a diagram that illustrates an embodiment of a ring laser gyro.

In FIG. 3A, the second reflective surface substrate illustrated by sign 40A has a reflective surface 40A1. The part reflecting laser beams in the reflective surface 40A1 of the second reflective surface substrate 40A is made thinner walled and transmits a portion of the circulating laser beams. A prism 80 is disposed in this thinner walled part.

Figure 3B:
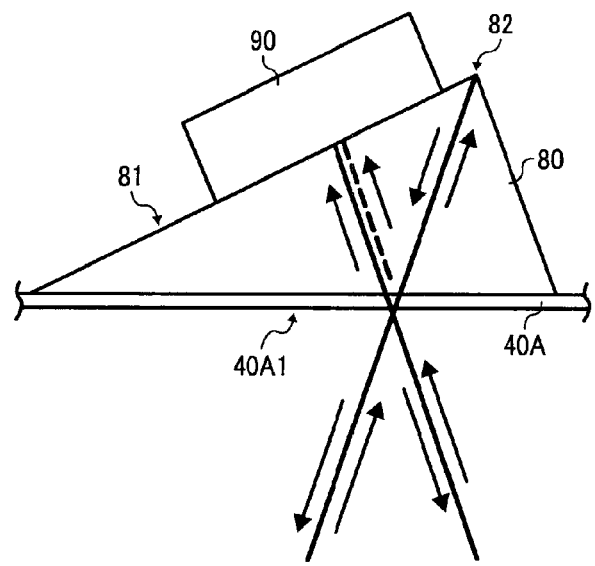
FIG. 3B illustrates as a diagram of an enlarged state of FIG. 3A.

A portion of the laser beams emitted from the light source 50 towards the right side of the figure and transmitted through the lens 62, transmits through the above-described thinner walled part and enters a prism surface 81 of the prism 80. By contrast, a portion of the laser beams emitted from the light source 50 towards the left side of the figure and transmitted through lens 61, transmits through the above-described thinner walled part and enters a corner part 82 of the prism 80, then return to the hypotenuse part of the prism 80 slightly out of alignment from the entering light path to the corner part 82, then enters the prism surface 81 after being reflected by the hypotenuse part. FIG. 3B illustrates a description diagram with this state enlarged.

In this way, two laser beams enter the prism surface 81. The corner angle of the corner part 82 of the prism 80 is disposed slightly displaced from 90 degrees so that two light beams entering the prism surface 81 mutually form a micro angle in the direction of progression and cross over.

In such a way, two light beams cross over in the prism surface 81. Because these laser beams are coherent, they mutually interfere to generate interference fringe, FIGS. 3C, 3D and 3E illustrate in a frame format the appearance of an interference fringe generated in such a way.

The laser beam circulating the light path circuit LC circulates in forward and backward directions, that is, in FIG. 3A in clockwise and counter clockwise directions. The laser beam laser oscillates with a light path length as resonant length. In this state, the light path circuit in its entirety rotates around an axis orthogonal to the figure and misalignment is generated by Sagnac effects between clockwise laser oscillation wavelength and counter clockwise oscillation wavelength. Angular velocity can be calculated by detecting the misalignment as beat frequency.

Figure 3C:
FIGS. 3C, 3D and 3E illustrate in a frame format the appearance of an interference fringe generated.
Figure 3D:
Figure 3E:

FIG. 3C is a state of the interference fringe when angular velocity is zero (standard state). FIGS. 3D and 3E illustrate the appearance of an interference fringe when rotation is generated by a light path circuit LC in a clockwise direction or a counter clockwise direction around an axis orthogonal to the figure of FIG. 3A. The interference fringe deviates out of alignment towards right or left from the standard state depending on whether the direction of rotation is clockwise or counter clockwise. The out of alignment quantity corresponds to the above-described beat frequencies and is proportional to the rotational angle side.

Therefore, the appearance of the interference fringe is detected by an interference fringe sensor 90 with a CCD sensor or the like. Angular velocity can be calculated by performing prescribed calculations based on detection results.

Incidentally, the angular velocity $\Omega$ to be calculated can be provided with the following well-known formula with the above-described beat frequency as "f", the area of a triangle formed by the light path circuit LC within the one plane as "S", the light path length of the light path circuit as "L" and the wavelength of laser beams as "$\lambda$".

$$\Omega = L \cdot \lambda \cdot f / (4 \cdot S) \qquad (A)$$

Beat frequency "f" is calculated by the amount of displacement of the interference fringe. The output of the interference fringe sensor 90 is inputted to a calculation device (not illustrated) of a computer or the like and the above formula (A) is calculated so that angular velocity can be obtained.

According to formula (A), angular velocity $\Omega$ is inversely proportional to the area S of the light path circuit. Therefore, the shape of the light path circuit is preferably set so that the area is large.

Like a light path circuit according to claim 10, by setting the number of reflective surfaces for constituting one light path circuit to four or six, a light path circuit of a rectangular shape or a hexagonal shape with a large area can be constituted.

That is, a ring laser gyro described referring to FIG. 3 includes a light path circuit apparatus illustrated in FIG. 3A, an interference fringe generation device that takes out a portion of laser beams circulating in forward and backward directions of the light path circuit LC of the light path circuit apparatus and lets the portion of laser beams interfere to generate interference fringe (the interference fringe generation device is constituted by a thinner walled part of the second reflective surface substrate 40A and a prism 80), a detection device 90 that detects the changes of the interference fringe and a calculation device (a computer or the like not illustrated) that calculates angular velocity based on the detected changes of the interference fringe.

A case example of a triangular shaped light path circuit is described above.

Case examples of a rectangular and a hexagonal shaped light path circuit are described hereinbelow FIG. 4 is a diagram that illustrates an embodiment of a light path circuit apparatus that constitutes a rectangular light path circuit. FIG. 4A is a cross-sectional diagram viewed from the front face side. Sign 10 illustrates a bottom surface substrate the same as FIG. 1, the upper surface of which constitutes a standard plane.

A first reflective surface substrate 200, a glass substrate 600, a spacer substrate 300 and a second reflective surface substrate 400 are laminated on the standard plane, parallel to the standard plane and in a direction orthogonal to the standard plane.

Figure 4A:
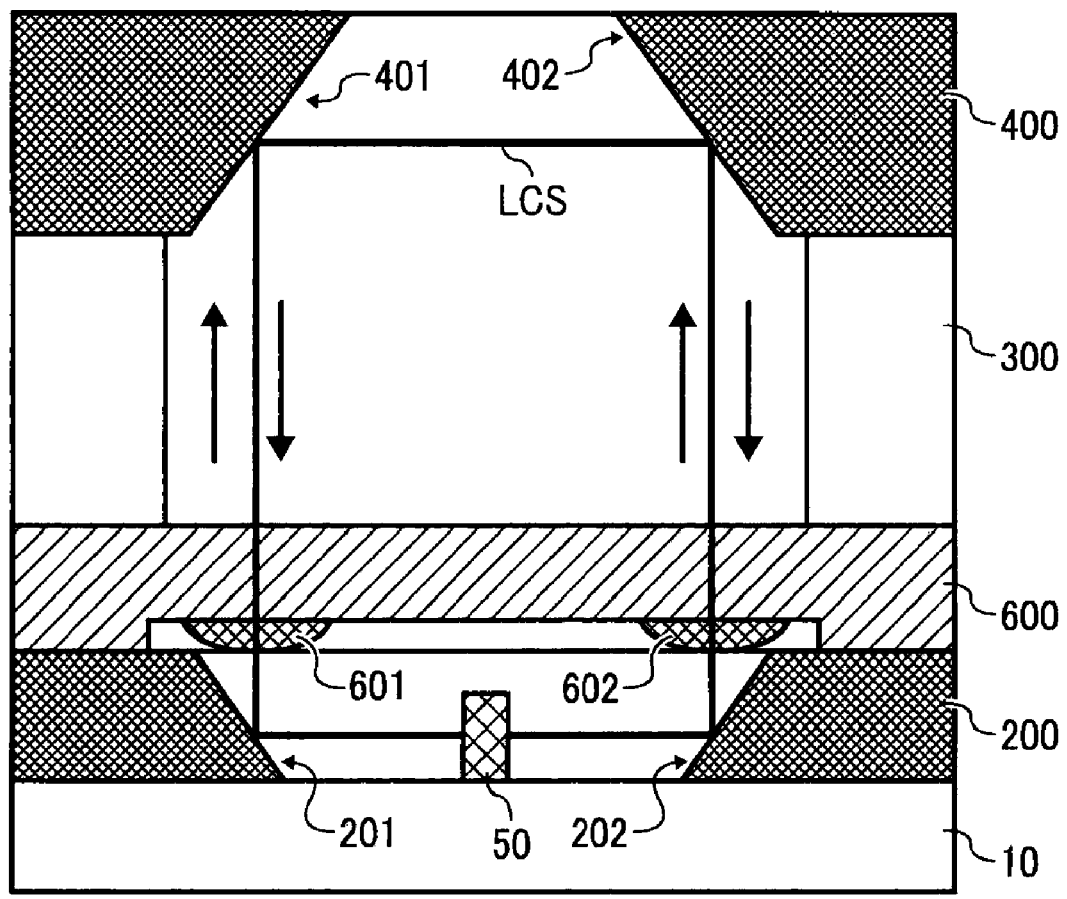
FIG. 4A is a cross-sectional diagram viewed from the front face side.
Figure 4B:
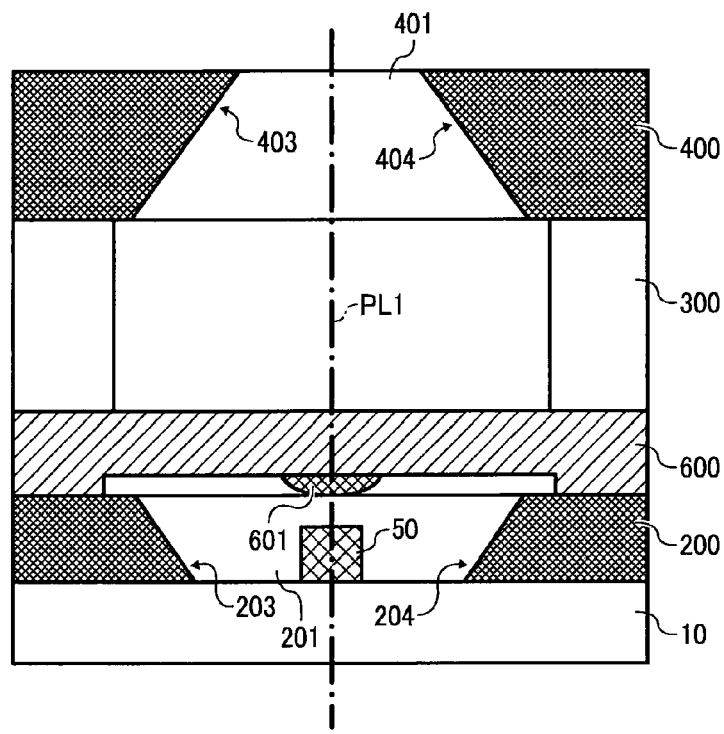
FIG. 4B is a cross-sectional diagram illustrating a state when viewing FIG. 4A from the right side.
Figure 4C:
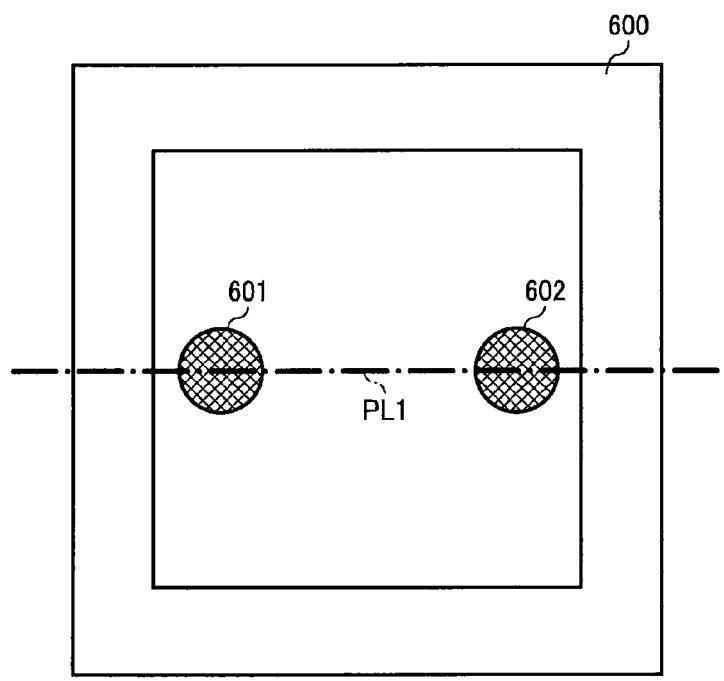
FIG. 4C is a view of the glass substrate 600 from the bottom part of FIG. 4A.
Figure 4D:
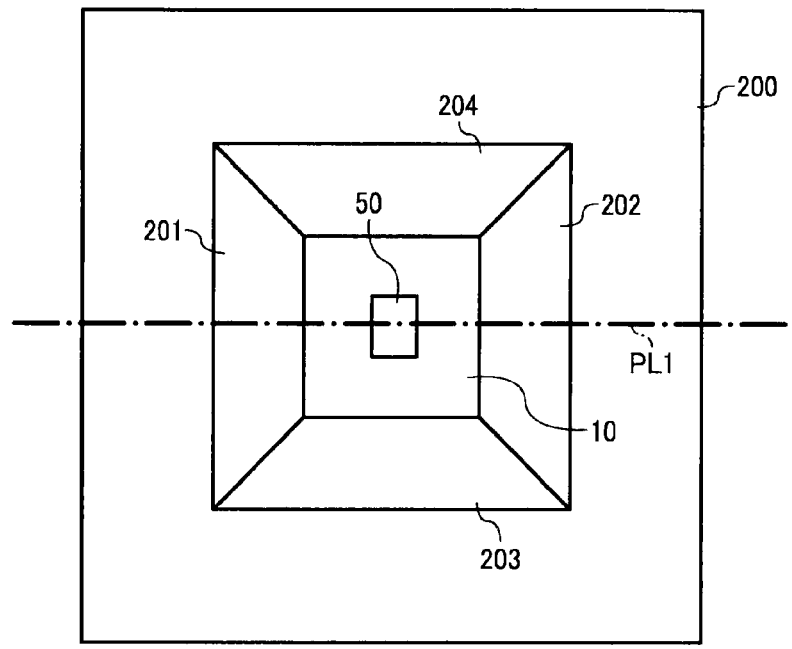
FIG. 4D is a top view of the fist reflective surface substrate 200.

FIG. 4D is a top view of the first reflective surface substrate 200. A hole of a shape of a regular quadrangular pyramid is drilled through the first reflective surface substrate 200. The above-described semiconductor laser element 50 is disposed as a light source on the surface (standard plane) of the bottom surface substrate 10 with the bottom surface substrate 10 exposed to a small diameter part of the hole. The tilted surfaces 201, 202, 203, 204 that form pyramid surfaces of the regular quadrangular pyramid are tilted against the standard plane having 45 degree tilted angles, in the present embodiment, tilted surfaces 201, 202 are used as reflective surfaces that constitute the light path circuit. Tilted surfaces 201, 202 are referred to as reflective surfaces 201, 202 hereinbelow.

As shown in FIG. 4A, laser beams emitted from the light source 50 in left and right directions of the figure parallel to the standard plane, when reflected by reflective surfaces 201, 202, are deflected 90 degrees in the direction of progression and proceed upwards in FIG. 4A.

Figure 4E:
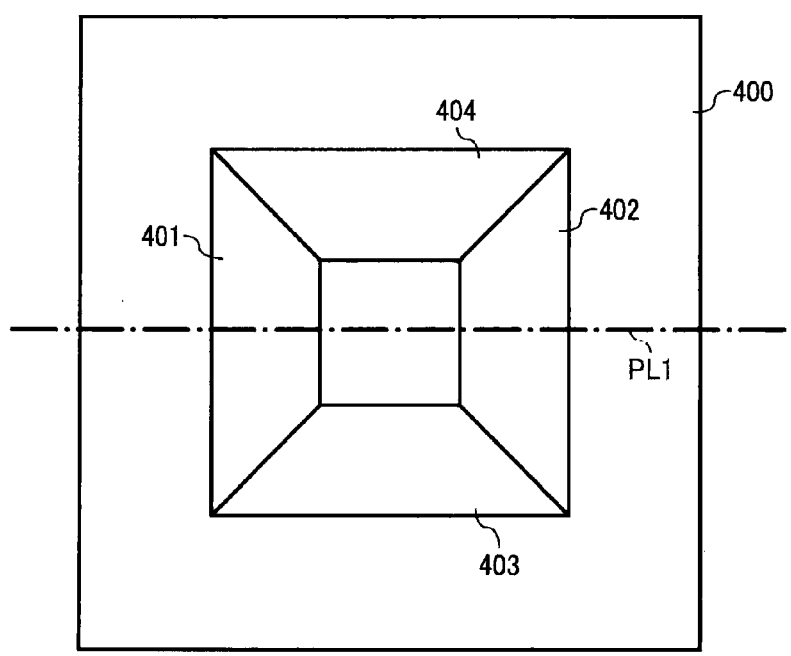
FIG. 4E is a bottom view of the second reflective surface substrate 400.

FIG. 4E is a bottom view of the second reflective surface substrate 400. A hole of a shape of a regular quadrangular pyramid is drilled through the second reflective surface substrate 400. The tilted surfaces 401, 402, 403, 404 that form pyramid surfaces of the regular quadrangular pyramid have 45 degree tilted angles against the standard plane, in the present embodiment, tilted surfaces 401, 402 are used as reflective surfaces that constitute the light path circuit. Tilted surfaces 401, 402 are referred to as reflective surfaces 401, 402 hereinbelow.

In the glass substrate 600, two micro lenses 601, 602 are constituted on a surface of the side of the first reflective surface substrate 200 and perform divergence angle adjustment against laser beams reflected by reflective surfaces 201, 202 and proceeding upwards in FIG. 4A. The laser beams with the divergence angle adjusted pass through the cavity of the spacer substrate 300, are then reflected by the reflective surfaces 401, 402 of the second reflective surface substrate 400 to become light beams parallel to the standard plane, are further reflected by reflective surfaces 402, 401 and pass through the micro lenses 602, 601, thereafter reflected by reflective surfaces 202, 201 and return to the light source 50.

In such a way, as shown in FIG. 4A, a light path circuit LCS of a rectangular shape is constituted. Laser beams circulate the light path circuit LCS in forward and backward directions (clockwise and counter clockwise directions) and laser oscillation is performed at the light source 50.

FIG. 4B is a cross-sectional diagram illustrating a state viewing FIG. 4A from the right side. FIG. 4C is a view of the glass substrate 600 from the bottom part of FIG. 4A. As illustrated in these figures, the light source 50 and the micro lenses 601, 602 are all disposed on one plane PL1 orthogonal to the standard plane. Therefore, the light path circuit LCS is constituted within one plane PL1.

The first reflective surface substrate 200 and the second reflective surface substrate 400 can be constituted by silicon substrates but resin substrates and glass substrates can also be used. A hole of a shape of a regular quadrangular pyramid having a tilted angle of 45 degrees can be constituted by mold shaping.

The reflective surfaces of these first, second reflective surface substrates 200, 400 are preferably applied with gold coating or the like so that laser beams can be easily reflected. In the present embodiment of FIG. 4, the micro lenses 601, 602, as divergence angle adjustment devices, tun the laser beams from the light source side into approximate parallel beams of light. Laser beams circulating the light path circuit and returning to the light source go back into the interior of the semiconductor laser in a most condensed state at an edge surface on the opposite side to the emission surface of the semiconductor laser element.

When constituting a ring laser gyro using a light path circuit apparatus as such, for example, a portion of the reflective surface 402 of the second reflective surface member 400 is made thinner walled, and by using a prism 80, an interference fringe sensor 90 as described in FIG. 3 as well as a calculation device not illustrated, angular velocity detection can be performed in the same way as the case of the above-described FIG. 3.

FIG. 5 illustrates an embodiment in which a light path circuit of a hexagonal shape is constituted.

Figure 5A:
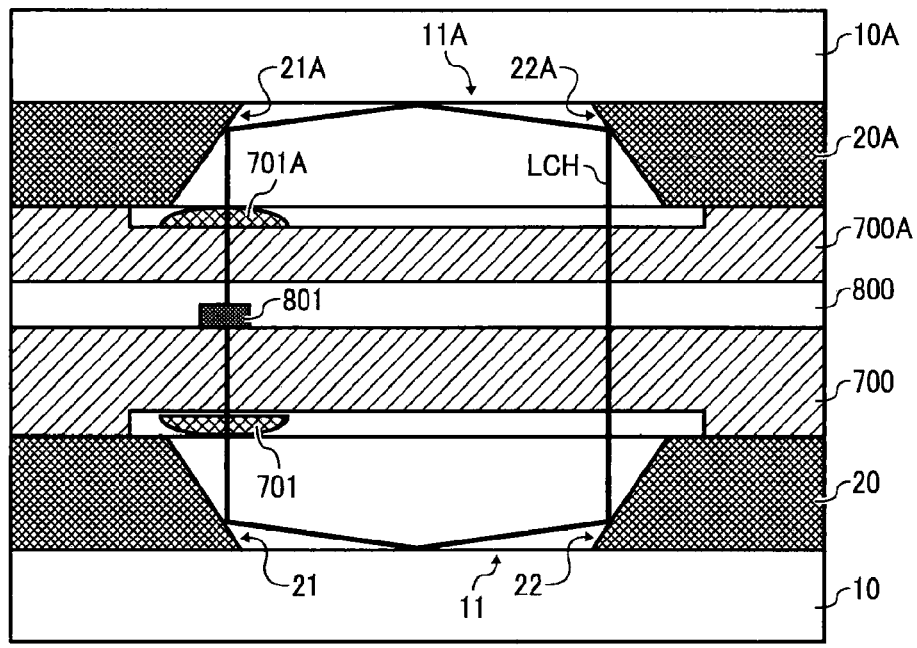
FIG. 5A is a cross-sectional diagram that illustrates schematically the view from the front side.

FIG. 5A is a cross sectional diagram that illustrates schematically viewing from the front side. As illustrated by the same figure, the light path circuit apparatus has a constitution in which a first reflective surface substrate 20, a glass substrate 700, a light source substrate 800, a glass substrate 700A, a second reflective surface substrate 20A and an upper surface substrate 10A are laminated parallel to the standard plane 11 in a direction orthogonal to the standard plane 11 (a plane on the upper side of the bottom surface substrate 10) above the bottom surface substrate 10.

The first reflective surface substrate 20 and the second reflective surface substrate 20A are of the same constitution, for example, in the same way as the first reflective surface substrate 20 used in FIG. 1, a hole of a shape of a regular quadrangular pyramid having a tilted surface (111 surface) of a ±54.7 degree tilted angle against the standard plane is drilled through a silicon substrate with its surface as the 100 surface by anisotropic etching.

In a small diameter part of a hole of a shape of a regular quadrangular pyramid drilled through the first reflective surface substrate 20 and the second reflective surface substrate 20A, an upper surface of the bottom surface substrate 10 (standard plane 11) and a lower surface 11A of the upper surface substrate 10A are exposed. Of the present embodiment, the upper surface 11 of the bottom surface substrate 10 and the lower surface 11A of the upper surface substrate 10A are both also used as reflective surfaces.

A surface light emitting type laser light source element 801 is disposed within the light source substrate 800. The laser light source element 801 emits laser beams from two surfaces parallel to the standard plane in the light source substrate 800. The laser light source element 801 differs from a general surface light emitting laser in that it does not have a reflection mirror in the light source itself used for prescription of resonance length so that resonance wavelength dependent on light path circuit length can be obtained.

In the glass substrate 700, 700A, micro lenses 701, 701A as shown in the figure have a common light axis and are constituted so that the laser light source element 801 is positioned on the light axis.

With regard to the laser beams emitted downwards from a laser light source element 801 of FIG. 5A, the laser beams, after transmitting through a glass substrate 700, are turned into approximately parallel beams by having the divergence angle adjusted by a micro lens 701, then reflected by a reflective surface 21 of the first reflective surface substrate 20, thereafter reflected by an upper surface 11 (constituted as a reflective surface) of the bottom surface substrate 10, then enter the reflective surface 22, and when reflected by the reflective surface 22, become laser beams towards an upward direction of FIG. 5A, after transmitting in sequence through the glass substrate 700, the light source substrate 800 and the glass substrate 700A, are reflected in sequence first by a reflective surface 22A of the second reflective surface substrate 20A, then by an under surface 11A (constituted as a reflective surface) of an upper surface substrate 10A, are further reflected by a reflective surface 21A of the second reflective surface substrate 20A and become laser beams towards a downward direction of FIG. 5A, thereafter transmit through the micro lens 701A, the glass substrate 700A and the light source substrate 800 and finally return to the laser light source element 801.

In this way, a light path circuit LCH of a hexagonal shape is constituted. That is, laser beams emitted downwards in FIG. 5A from the laser light source element 801 circulate the light path circuit LCH in a counter clockwise rotation while in contrast laser beams emitted upwards in FIG. 5A from the laser light source element 801 circulate the light path circuit LCH in a clockwise rotation. In the present embodiment, each reflective surface that reflects laser beams can be preferably applied with gold coating or the like so that laser beams can be reflected more easily.

Figure 5B:
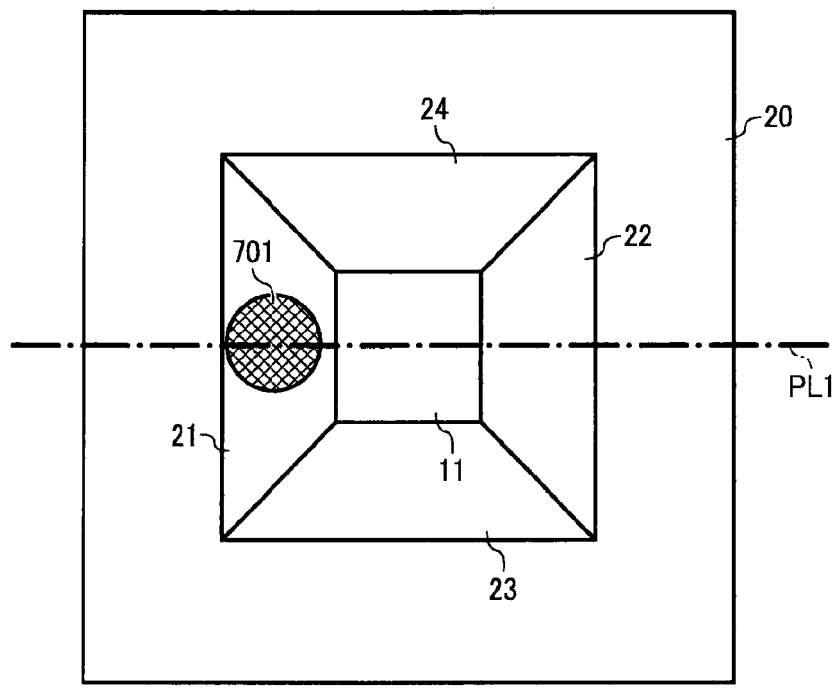
FIG. 5B illustrates a positional relationship of the first reflective surface substrate 20, the standard plane 11 of the bottom surface substrate 10 and the micro lens 701 when viewed from above in FIG. 5A.

FIG. 5B illustrates a positional relationship of the first reflective surface substrate 20, the standard plane 11 of the bottom surface substrate 10 and the micro lens 701 viewed from above of FIG. 5A. This relationship is the same as the positional relationship of the second reflective surface substrate 20A, the upper surface substrate 10A and the micro lens 701A.

Because the laser light source element 801 is on the light axis of the micro lens 701, 701A, the light path circuit LCH is constituted within one plane PL1 orthogonal to the standard plane.

In order to constitute a precise light path circuit in which laser beams circulate, the reflective surface 11 and reflective surface 11A can be constituted so that they are micro movable in a direction orthogonal to the standard plane.

When constituting a ring laser gyro using the light path circuit apparatus of FIG. 5, for example, the portion of the upper surface substrate 10A that reflects laser beams (the portion of reflective surface 11A) is made thinner walled, using a prism 80, an interference fringe sensor 90 and a calculation device not illustrated described referring to FIG. 3, the detection of angular velocity can be performed in the same way to the case of FIG. 3.

When divergence angle adjustment is performed using the micro lenses, in a light path circuit LC1 of a triangular shape as shown in the example of FIG. 2, laser beams become tilted against the light axis of the micro lenses 71, 72. But in a light path circuit of a rectangular shape of FIG. 4 and a light path circuit of a hexagonal shape of FIG. 5, a portion of the light path circuit can be matched to the light axis of the micro lens and good characteristics can be obtained.

An example of constituting a singular light path circuit is described above. Hereinbelow an example of further constituting a second light path circuit besides the above-described singular light path circuit as the first light path circuit is described for the cases in which the shape of light path circuit is triangular, rectangular and hexagonal.

FIG. 6 uses as a basic embodiment the embodiment described referring to FIG. 1, defines the light path circuit used in the basic embodiment as the first light path circuit LC1, illustrates an embodiment in which a second light path circuit LC2 is further constituted. The embodiment of FIG. 6 uses the embodiment of FIG. 1 as a base, same signs as FIG. 1 are used except the parts of addition or change against the constitution of FIG. 1.

Figure 6A:
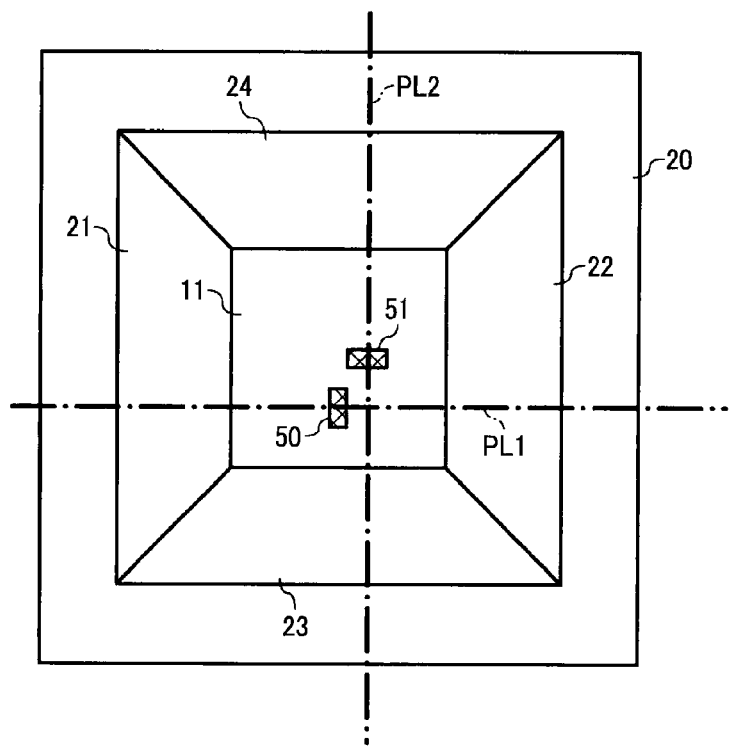
FIGS. 6A and 6B are examples of two light path circuits LC1, LC2 using two separate light sources 50, 51 (semiconductor laser elements).
Figure 6B:
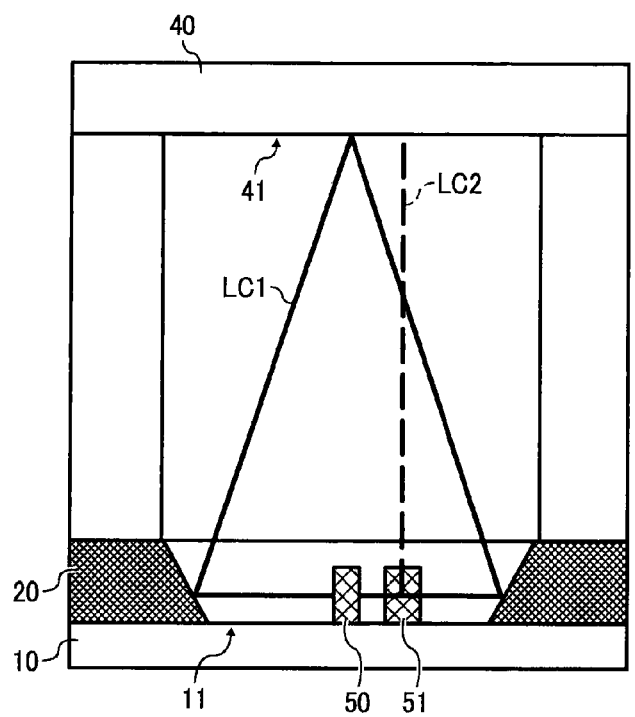

FIGS. 6A, 6B are an example of constituting two light path circuits LC1, LC2 using two separate light sources 50, 51 (semiconductor laser element) (claim 2).

The semiconductor laser element 50, as shown in FIG. 6A, emits laser beams in left and right directions of the figure parallel to the standard plane 11 (the upper surface of bottom surface substrate 10) while the semiconductor laser element 51 emits laser beams in up and down directions of the figure parallel to the standard plane. As shown in FIGS. 6A, 6B, the light path of laser beams emitted from the semiconductor laser element 50 constitutes a triangular shaped light path circuit LC1 within one plane PL1 orthogonal to the standard plane. The light path of laser beams emitted from the semiconductor laser element 51 constitutes a triangular shaped light path circuit LC2 within a second plane PL2 orthogonal to the standard plane. Plane PL1 and PL2 are both orthogonal to the standard plane and mutually orthogonal.

That is, reflective surfaces 21, 22 and 41 constitute the three reflective surfaces that reflect and circulate laser beams against laser beams emitted from the semiconductor laser element 50. Reflective surfaces 23, 24 and 41 constitute the three reflective surfaces that reflect and circulate laser beams against laser beams emitted from the semiconductor laser element 51. That is, the reflective surface 41 of the second reflective surface substrate 40 is used commonly between the two pairs of three reflective surfaces that constitute two light path circuits LC1 and LC2.

In order to avoid mechanical interference between the two semiconductor laser elements 50, 51 used for two light path circuits LC1, LC2, the two semiconductor laser elements 50, 51 are disposed slightly offset from the position of a central axis of a regular quadrangular pyramid shape constituted by reflective surfaces 21-24.

Figure 6C:
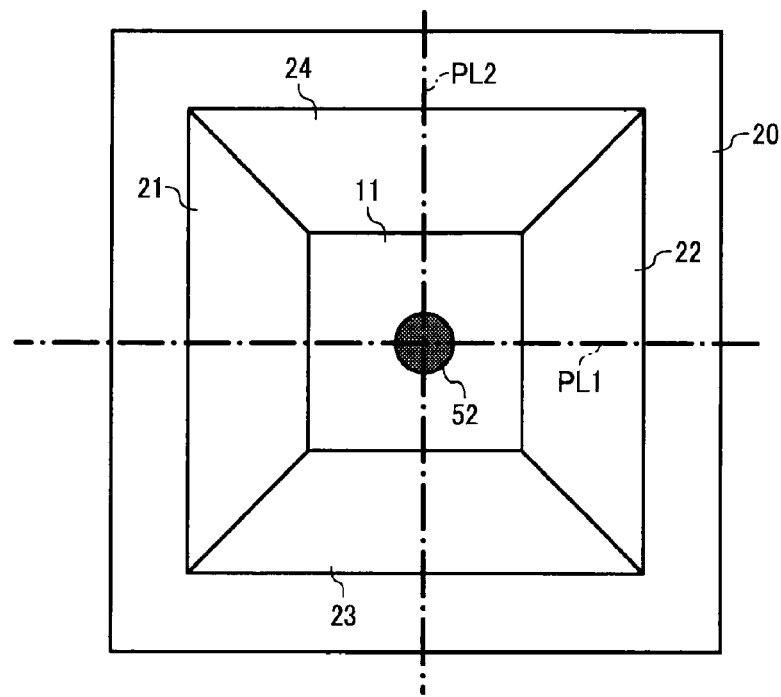
FIGS. 6C, 6D are examples of a slightly modified light path circuit apparatus of FIG. 1.
Figure 6D:
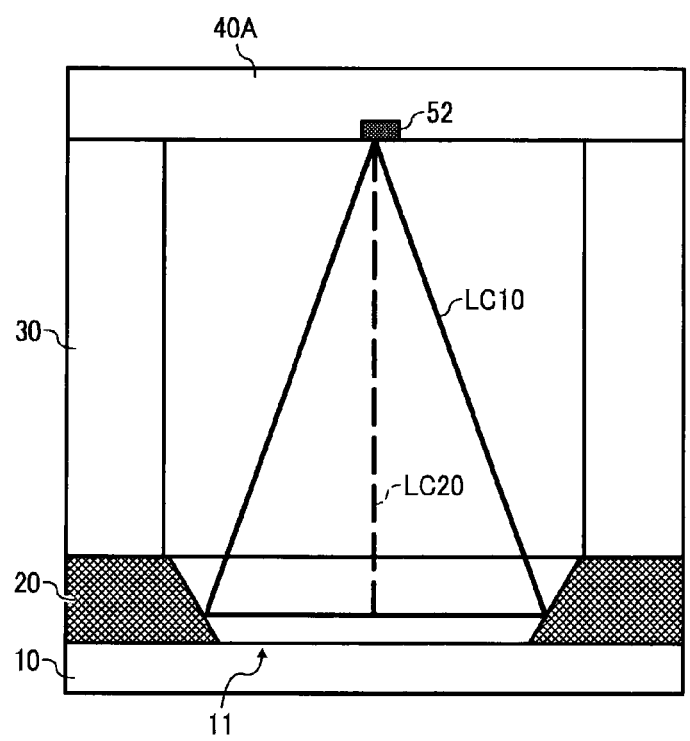

FIGS. 6C, 6D are an example of slightly modifying the light path circuit apparatus of FIG. 1 so that a light source for constituting a light path circuit within a prescribed one plane PL1 and a second light source for constituting a light path circuit within a second plane PL2 are a combined into one light source 52.

In this example, as shown in FIGS. 6C, 6D, a light source 52 (laser light emitting element) is disposed within a light source substrate 40A disposed on the uppermost part and situated on an axis of a regular quadrangular pyramid shape drilled through on the first reflective surface substrate 20.

A membrane (not illustrated) is formed on an injection part of light from the light source 52 of the light source substrate 40A. An injection angle of light can be controlled to a certain extent by designing the membrane appropriately. In the present embodiment, the above-described injection angle of light, with regard to up and down directions as well as left and right directions of FIG. 6C, can be expanded to angles able to enter symmetrically the reflective surfaces 21, 22 and reflective surfaces 23, 24 mutually opposed to each other and the respective reflective surfaces can be oscillated as resonance surfaces. Because the light source 52 can be constituted within the light source substrate, the step of mounting two light sources 50, 51 on the bottom surface substrate 10 as shown in the example of FIGS. 6A, 6B can be saved. In such a way, light path circuits LC10 and LC20 can be constituted within the first and second planes PL1 and PL2 mutually orthogonal and orthogonal to the standard plane, thereby laser beams circulate in forward and backward directions within these first and second light path circuits LC10 and LC20.

Micro lenses as divergence angle adjustment devices are abbreviated for illustration in FIG. 6, but in fact, two micro lenses are disposed for each light path circuit using the appropriate method.

By using the two light path circuits shown in FIG. 6, a ring laser gyro able to detect angular velocity in directions of two mutually orthogonal axes can be constituted.

In a case shown by FIGS. 6A, 6B, in order to constitute a ring laser gyro, the second reflective surface substrate 40 is made thinner walled in the same way to the case of FIG. 3, a portion of laser beams circulating each light path circuit in forward and backward directions is taken out to interfere, thereby an interference fringe cal be detected.

In this case, two prisms identical to the prism 80 are used and it is necessary to set one interference fringe sensor for each prism. Because the thickness of the two prisms should be slightly larger than the beam width of laser beams, the thickness of prisms can be extremely thin. Therefore, the two prisms and interference fringe sensors can be disposed without any mutual mechanical interference on the thinner walled part of the second reflective surface substrate.

FIG. 7 illustrates an embodiment in which two light path circuits of a rectangular shape are formed.

The embodiment of FIG. 7 is based on the embodiment of FIG. 4. The same parts to the embodiment of FIG. 4 are referenced with the same signs as FIG. 4.

Figure 7A:
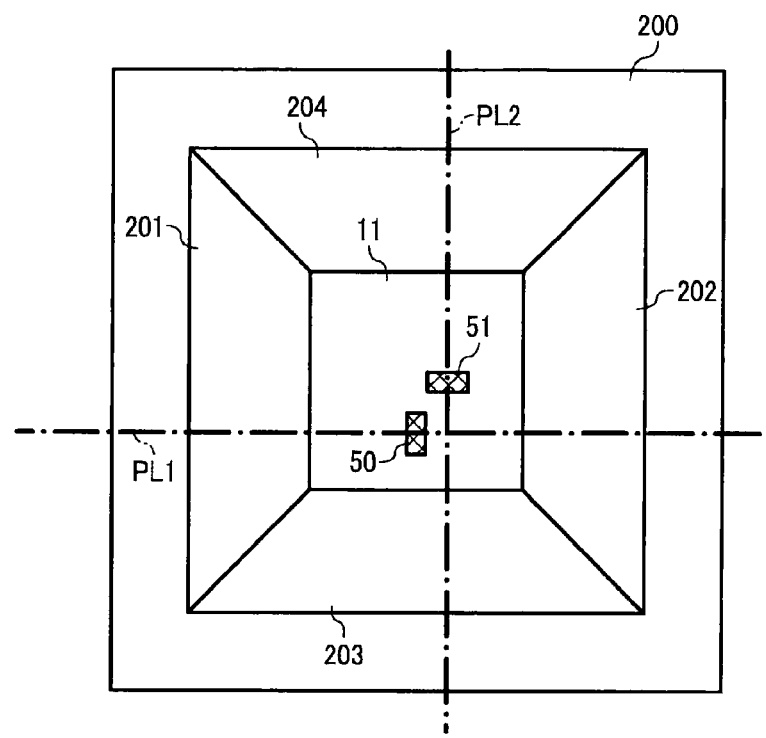
FIGS. 7A and 7B are examples in which two light path circuits LCS1, LCS2 are constituted by using semiconductor laser elements 50, 51 as two separate light sources.
Figure 7B:
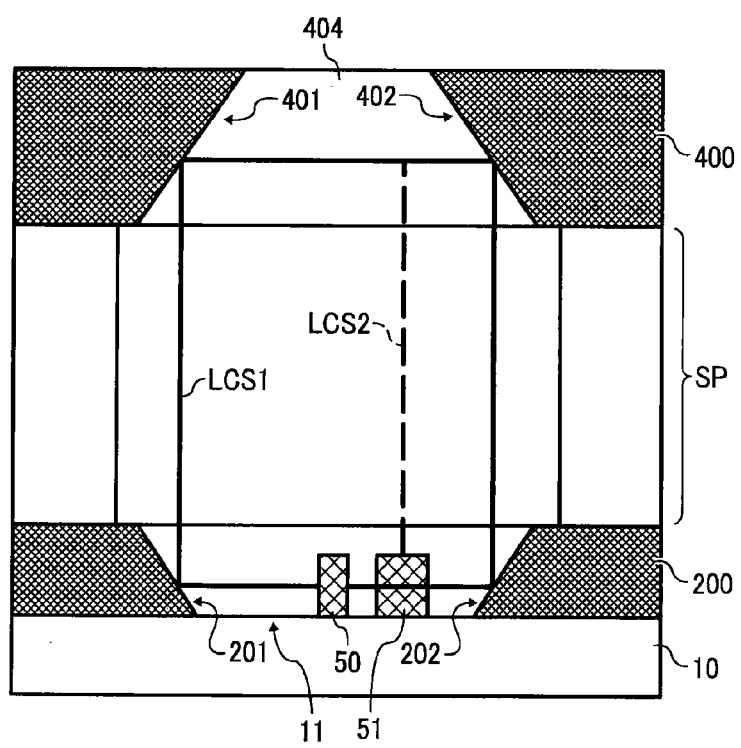

FIGS. 7A, 7B is an example in which two light path circuits LCS1, LCS2 are constituted by using semiconductor laser elements 50, 51 as two separate light sources.

As illustrated in FIG. 7A, the semiconductor laser element 50 emits laser beams parallel to the standard plane 11 (the upper surface of bottom surface substrate 10) in left and right directions of the same diagram, whereby the semiconductor laser element 51 emits laser beams parallel to the standard plane in up and down directions of the same diagram. As illustrated in FIGS. 7A, 7B, the light path of laser beams emitted from the semiconductor laser element 50 constitutes a light path circuit LCS1 of a rectangular shape within a plane PL1 orthogonal to the standard plane 11 while the light path of laser beams emitted from the light source 51 constitutes a light path circuit LCS2 of a rectangular shape within a second plane PL2 orthogonal to the standard plane 11. Plane PL1 and plane PL2 are both orthogonal to the standard plane 11 and mutually orthogonal.

That is, reflective surfaces 201, 202, 401, 402 constitute the four reflective surfaces that reflect and circulate laser beams with regard to laser beams emitted from the semiconductor laser element 50. Reflective surfaces 203, 204, 403 (not illustrated, but the same as FIG. 4E), 404 constitute the four reflective surfaces that reflect and circulate laser beams with regard to laser beams emitted from the semiconductor laser element 51.

In order to avoid mechanical interference between the semiconductor laser elements 50, 51 used as two light sources for the two light path circuits LCS1 and LCS2, these are disposed slightly offset from the position of a central axis of a regular quadrangular pyramid shape constituted by reflective surfaces 201-204.

In FIGS. 7A, 7B, the part illustrated by the sign SP is a part that illustrates abbreviating the spacer substrate 300, the glass substrate 600 and micro lenses of FIG. 4. It is clear that in the glass substrate abbreviated for illustration, two micro lenses for each light path circuit are disposed in a positional relationship illustrating the positions of the top left point and top right point of a square.

Figure 7C:
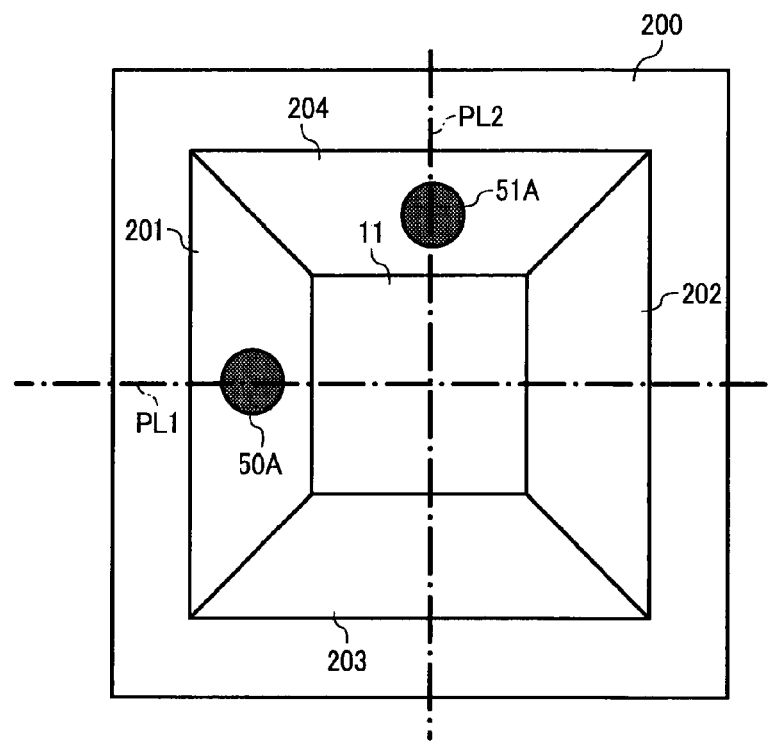
FIGS. 7C, 7D are examples in which light sources 50A, 51A as surface light emitting type laser light sources are disposed on the light source substrate.
Figure 7D:
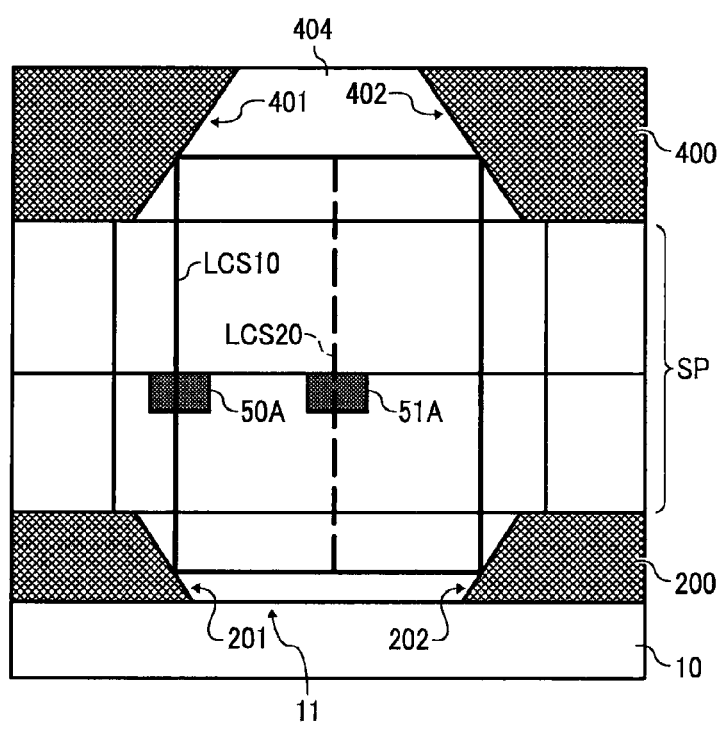

FIGS. 7C, 7D are an example in which light sources 50A, 51A as surface light emitting type laser light sources are disposed on the light source substrate, laser beams from the light sources 50A, 51A are emitted from the two surfaces of the light source substrate in a direction orthogonal to the substrate surface. The light sources 50A, 51A are together disposed separately within the same surface of the light source substrate. In this example, the constitution of the part illustrated by sign SP of FIG. 7D is the same as the constitution of the part of the glass substrates 700, 700A and the light source substrate 800 of FIG. 5. Of course, because two light sources 50A, 51A are disposed on the light source substrate, two micro lenses (not illustrated) that adjust the divergence angles of laser beams from the respective light sources are constituted on each glass substrate.

In such a way, light path circuits LCS10, LCS20 can be constituted respectively within a first plane PL1 and a second plane PL2 orthogonal to the standard plane and mutually orthogonal.

A ring laser gyro is constituted by forming two light path circuits mutually orthogonal as shown in FIG. 7 so that angular velocity can be detected in directions of two mutually orthogonal axes.

FIG. 8 illustrates an embodiment in which two light path circuits of hexagonal shapes are constituted.

The embodiment of FIG. 8 uses the embodiment of FIG. 5 as a base so that same parts as the base embodiment of FIG. 5 are referenced by the same signs.

Figure 8A:
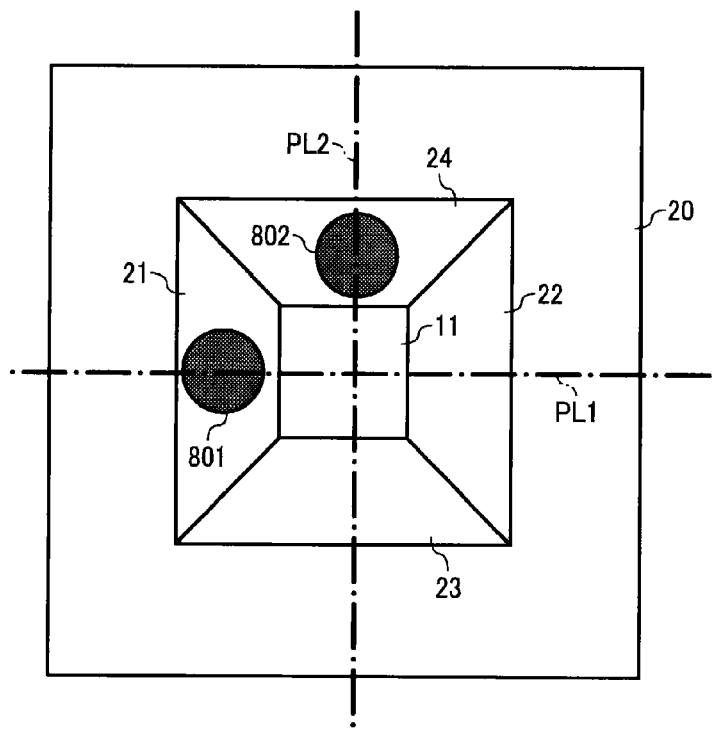
FIG. 8A illustrates as a schematic diagram the positional relationship of light sources 801, 802 and the first reflective surface substrate 20.
Figure 8B:
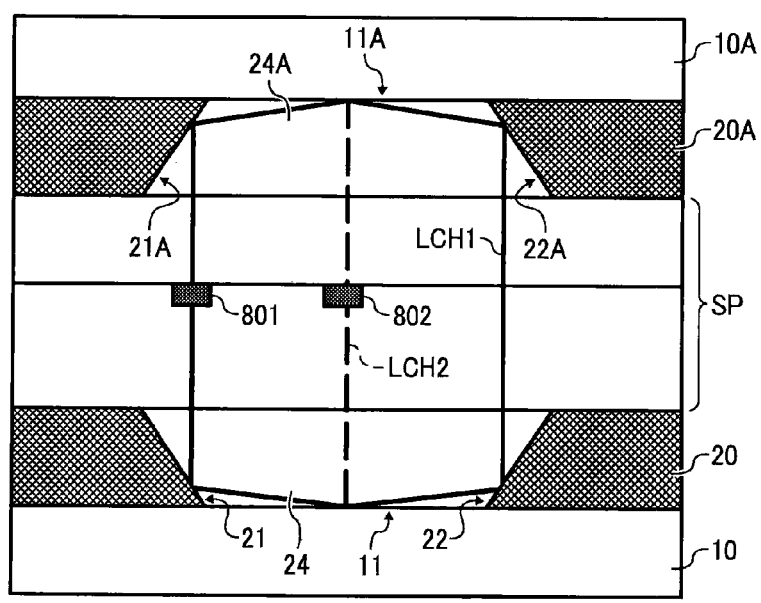
FIG. 8B is an example of two light path circuits LCH1, LCH2 using two separate light sources 801, 802.

In the embodiment of FIG. 8, two light path circuits LCH1, LCH2 of hexagonal shapes are constituted using two light sources 801, 802 as surface light emitting type laser light sources. The part shown by sign SP in FIG. 8B has a structure of the same constitution to the part of the glass substrates 700, 700A and light source substrate 800 of FIG. 5. The part is abbreviated and shown by sign SP.

FIG. 8A illustrates as a schematic diagram the positional relationship of light sources 801, 802 and the first reflective surface substrate 20. As shown in FIG. 8B, the light sources 801, 802 are both disposed separately within the same surface of the same light source substrate. The light source substrate is constituted by a surface light emitting laser such as VCSEL but without a resonance membrane. Because two light sources 801, 802 are disposed on the light source substrate, each glass substrate that sandwiches the light source substrate has two micro lenses (not illustrated) that adjust the divergence angle of laser beams from the respective light sources 801, 802. The light sources 801, 802 are positioned on the optical axes of these micro lenses.

With such a constitution, two light path circuits LCH1, LCH2 of a hexagonal shape are formed within two planes PL1 and PL2 mutually orthogonal and orthogonal to the standard plane.

As shown in FIG. 8B, reflective surfaces 21, 22, 21A, 22A, 11 and 11A constitute the six reflective surfaces that reflect and circulate laser beams against laser beams emitted from the light source 801. Reflective surfaces 23 (not illustrated, but the same as FIG. 5B), 24, 24A, 23A (not illustrated, but a reflective surface of the second reflective surface substrate which forms a pair with the reflective surface 23 of FIG. 5B), 11 and 11A constitute the six reflective surfaces that reflect and circulate laser beams against laser beams emitted from the light source 802.

Therefore, reflective surfaces 11, 11A are common with regard to the two light path circuits LCH1, LCH2.

A ring laser gyro is constituted by forming two light path circuits mutually orthogonal as shown in FIG. 8 so that angular velocity can be detected in directions of the two axes mutually orthogonal.

By the way, in JP3751553B is disclosed an invention that forms a light path circuit within a plane parallel to the substrate and performs detection of angular velocity of a one axial direction utilizing Sagnac effects.

Figure 9:
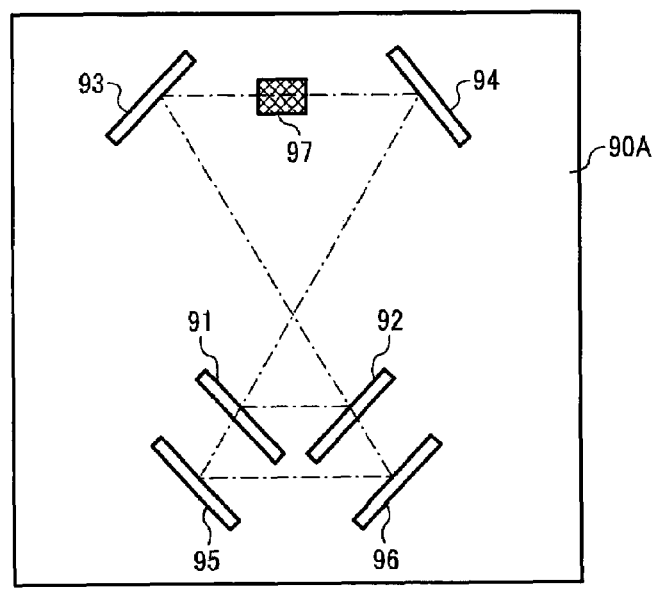
FIG. 9 is a diagram that illustrates a characteristic part of a light path circuit apparatus according to claim 4.

Describing this angular velocity detection with reference to FIG. 9, laser beams emitted from a semiconductor laser element 97 (not coated with reflection membrane) formed on an even substrate surface of the substrate 90A laser oscillate in a resonance circuit by mirrors 91~94 formed on the same even substrate surface of the substrate 90A, thereby a light path circuit that circulates within a plane parallel to the even substrate surface of the substrate 90A is constituted.

The light path including the semiconductor laser element 97 (the light path circuit by mirrors 91~94) is exclusively used for the formation of a resonance circuit. The interference fringe of light circulating in a forward and backward direction generated because of Sagnac effects is observed by an external interference fringe observation part formed by mirrors 95, 96.

By such a light path circuit, the rotational angular velocity around an axis orthogonal to the substrate surface of the substrate 90A can be detected.

As described above, the circling light path apparatus of the present invention includes a basic structure of laminating one or more substrates onto a base having a standard plane. In each embodiment described above, surfaces on the both edges of the laminating direction of the laminated base and substrate are mutually parallel surfaces. These surfaces are orthogonal to the planes PL1, PL2 in which light path circuits LC1, LC2 or the like are constituted.

Therefore, whichever of the surfaces on both edges of the laminating direction of the laminated base and substrate is set as a surface parallel to the standard plane. By constituting on this plane an angular velocity detection part according to a light path circuit shown in FIG. 9, in combination with the light path circuits constituted by planes PL1 and PL2, angular velocity can be detected in the directions of three axes orthogonal to each other. In such a way, the light path circuit apparatus according to the present invention and the ring laser gyro using the circling light path t apparatus can be realized.

Figure 10:
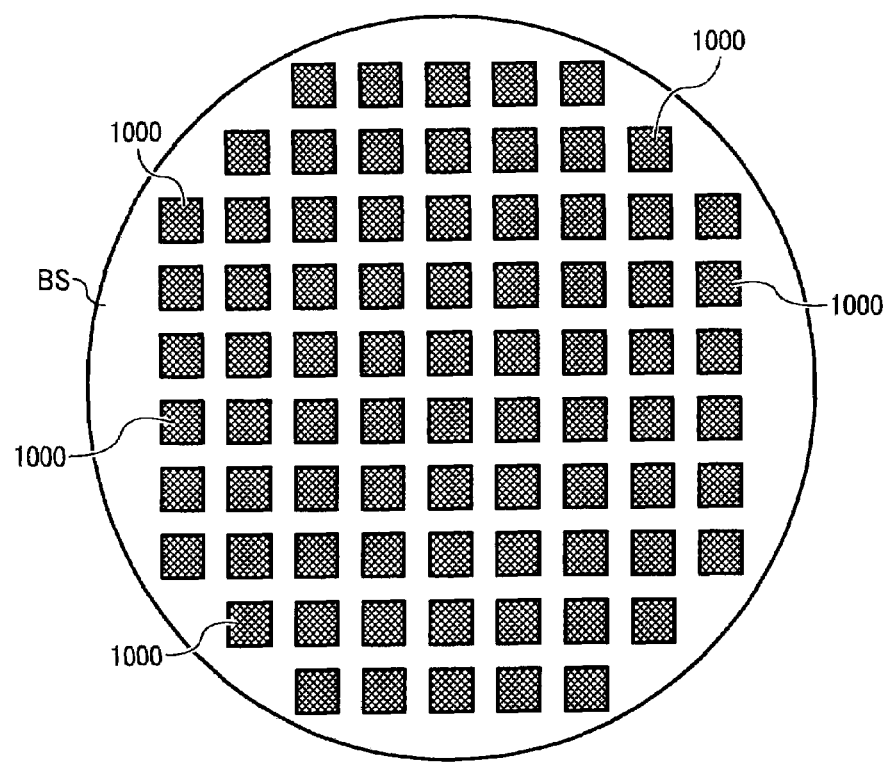
FIG. 10 is a diagram that illustrates a mass production of the light path circuit apparatus.

The circling light path circuit apparatus described above referring to FIG. 1~FIG. 8 is constituted by lamination of a base and one or more substrates. Functions (reflective surface function, spacer function, divergence angle adjustment function and light source function and so on) are distributed to each base or laminated substrates. Because the size of the light path circuit apparatus is small with the length, width and height all equal to a couple of millimeters, the device is not manufactured individually one by one, but prepared according to the necessary numbers for lamination substrates of a diameter of several tens of centimeters, thereby on each substrate, arrange shapes or the like corresponding to the distributed functions two dimensionally in a great number, then manufacture and laminate each substrate to produce as shown in FIG. 10, a great number of light path circuits 1000 arranged two dimensionally, and thereafter cut off each light path circuit 1000 individually so that a great number of light path circuit apparatuses can be easily manufactured at once.

As described above, a new light path circuit apparatus and a ring laser gyro using the light path circuit apparatus can be realized by the invention.

In the circling light path apparatus according to the present invention, the circling light path is constituted within a plane orthogonal to the standard plane. Two planes orthogonal to the standard plane with mutually differing normal line directions can be randomly set so that two light path circuits with mutually differing normal line directions against light path circuit surfaces can be randomly set and angular velocity detection of two axial directions becomes easily possible.

In addition, in a light path circuit apparatus according to the present invention, by constituting a light path circuit within a plane parallel to the standard plane on a base or a substrate, angular velocity detection of two axial directions or three axial directions becomes possible.

In addition, a light path circuit apparatus according to the present invention can be realized in an extremely small size. In addition, since the light path circuit apparatus comprises a lamination structure of a base and one or more substrates, alignment becomes easy and batch production is possible so that a cheap price is realized.

By using such a small sized, low cost light path circuit apparatus, a ring laser gyro according to the present invention has small zero point offset in comparison to a vibratory gyroscope in which zero point offset is problematic. The ring laser gyro according to the present invention is of high performance and adaptation against inertia navigation is possible. The ring laser gyro according to the present invention is of low cost so that the range of application towards consumer use machines or robots or the like can be expanded.

Although the preferred embodiments of the present invention have been described, it should be understood that the present invention is not limited to these embodiments, various modifications and changes can be made to the embodiments.

What is claimed is:

1. A circling light path apparatus, comprising:
a base having a standard plane;
a plurality of substrates laminated parallel to the standard plane in a direction orthogonal to the standard plane; and
a first light source including a laser, and
wherein the circling light path apparatus includes three or more reflective surfaces, and wherein said three or more reflective surfaces have normal lines that are parallel to, or tilted by a predetermined angle with respect to, a predetermined plane, and wherein said predetermined plane is orthogonal to the standard plane, and wherein said three or more reflective surfaces are located on said base and/or one or more of said substrates,
the light source is disposed to emit light within the predetermined plane, and
the light emitted from the light source circulates within the predetermined plane in forward and backward directions, and is reflected by said three or more reflective surfaces, and constitutes a circling light path that oscillates said laser.

2. A circling light path apparatus, comprising:
a base having a standard plane;
a plurality of substrates laminated parallel to the standard plane in a direction orthogonal to the standard plane; and
a first light source including a laser, and
wherein the circling light path apparatus includes three or more reflective surfaces, and wherein said three or more reflective surfaces have normal lines that are parallel to, or tilted by a predetermined angle with respect to, a predetermined plane, and wherein said predetermined plane is orthogonal to the standard plane, and wherein said three or more reflective surfaces are located on said base and/or one or more of said substrates,
the light source is disposed to emit light within the predetermined plane, and
the light emitted from the light source circulates within the predetermined plane in forward and backward directions, and is reflected by said three or more reflective surfaces, and constitutes a circling light path that oscillates said laser; and
wherein said apparatus includes a second light source including a laser, and
wherein the apparatus includes three or more reflective surfaces for the second light source, having normal lines within a second plane intersecting said predetermined plane and orthogonal to the standard plane,
the second light source is disposed to emit light within the second plane, and
the light emitted from the second light source circulates within the second plane in forward and backward directions, and is reflected by said three or more reflective surfaces for the second light source, and constitutes a second circling light path that oscillates said laser of said second light source.

3. A light path apparatus according to claim 2, wherein said first and second light sources are combined into one light source.

4. A circling light path apparatus, comprising:
a base having a standard plane;
a plurality of substrates laminated parallel to the standard plane in a direction orthogonal to the standard plane; and
a first light source including a laser, and
wherein the circling light path apparatus includes three or more reflective surfaces, and wherein said three or more reflective surfaces have normal lines that are parallel to, or tilted by a predetermined angle with respect to, a predetermined plane, and wherein said predetermined plane is orthogonal to the standard plane, and wherein said three or more reflective surfaces are located on said base and/or one or more of said substrates,
the light source is disposed to emit light within the predetermined plane, and
the light emitted from the light source circulates within the predetermined plane in forward and backward directions, and is reflected by said three or more reflective surfaces, and constitutes a circling light path that oscillates said laser; and
wherein a second light source and three or more reflective surfaces are formed to constitute a light path circuit in which light circulates within a plane parallel to the standard plane in forward and backward directions.

5. A light path apparatus according to claim 2, wherein a light source and three or more reflective surfaces are formed to constitute light path circuit in which light circulates within a plane parallel to the standard plane in forward and backward directions.

6. A light path apparatus according to claim 3, wherein a light source and three or more reflective surfaces are formed to constitute light path circuit in which light circulates within a plane parallel to the standard plane in forward and backward directions.

7. A light path apparatus according to claim 1, further comprising a divergence angle adjustment device that adjusts divergence angles of light emitted from said first light source.

8. A light path apparatus according to claim 7, wherein the divergence angle adjustment device is on said base or one or more of said substrates.

9. A light path apparatus according to claim 1, wherein said laser includes a semiconductor laser element.

10. A light path apparatus according to claim 1, wherein the first light source includes a surface light emitting type laser device that emits laser beams from surfaces of a substrate that is parallel to the standard plane.

11. A light path apparatus according to claim 1, further comprising a silicon substrate with a (100) plane surface and (111) plane reflective surfaces obtained by anisotropic etching of the (100) plane surface.

12. A light path apparatus according to claim 1,
wherein the number of reflective surfaces that constitute each light path circuit are three or four or six, and
the shape of light path circuits is triangular or rectangular or hexagonal.

13. A ring laser gyro, comprising:
a light path apparatus according to claim 1,
an interference fringe generation device that takes out a portion of laser beams circulating in the light path apparatus and lets the laser beams interfere to generate an interference fringe,
a detection device that detects the changes of the interference fringe, and
a calculation device that calculates angular velocity based on the detected changes of the interference fringe.

* * * * *